United States Patent [19]

Stowell

[11] 3,827,069
[45] July 30, 1974

[54] FOCUSING MECHANISM FOR UNDERWATER CAMERA

[76] Inventor: Harold Lindsley Stowell, 666 Eleventh St. N.W., Washington, D.C. 20001

[22] Filed: Mar. 1, 1973

[21] Appl. No.: 337,166

[52] U.S. Cl.................................. 95/11 AW, 95/45
[51] Int. Cl. ........................................... G03b 17/08
[58] Field of Search..................... 95/11 AW, 44, 45

[56] References Cited
UNITED STATES PATENTS
3,563,151  2/1971  Koeber ................................... 95/45

Primary Examiner—John M. Horan
Attorney, Agent, or Firm—Harold L. Stowell

[57] ABSTRACT

Apparatus for varying the focus of a lens system of a camera mounted in a sealed underwater housing is provided requiring no physical connection between the interior and the exterior of the sealed housing.

6 Claims, 8 Drawing Figures

FOCUSING MECHANISM FOR UNDERWATER CAMERA

BACKGROUND OF THE INVENTION

Typically underwater cameras are conventional cameras mounted in water-tight housings which will withstand the pressure of underwater applications. One of the difficulties in mounting cameras in such housings is the provision of external connections for mechanisms for operating shutter releases and film transport mechanisms, changing shutter speeds and for focusing of the cameras' lens system.

With the advent of automatic cameras whereby the shutter speed, the aperature or both are automatically set by suitable electrical and/or electronic means and with the advent of cameras having spring motors which automatically advance the cameras' film each time the shutter is actuated it has been possible to eliminate all external connections except the shutter actuating mechanism and means for focusing the cameras' lens system.

The present invention is directed to improved means for focusing an underwater camera wherein focusing is accomplished without physical connection between the interior and the exterior of the sealed pressure housing.

Another object of the present invention is to provide such mechanism wherein the operator is provided with a range of selectable focus settings so that sharply focused underwater pictures may be taken within the normal relatively limited field of underwater photography.

A further object is to provide such means that may be permanently associated with the camera or provided as an auxiliary attachment thereto.

These and other objects and advantages are provided by a focus adjusting means for a camera mounted in a sealed housing wherein the camera is of the type wherein focusing is accomplished by rotation of lens elements or element comprising: an arm secured to a lens element rotating member, and a mass mounted on said arm having an effective weight to rotate the rotating member.

The invention will be more particularly described in reference to accompanying drawing wherein.

Figure 1:
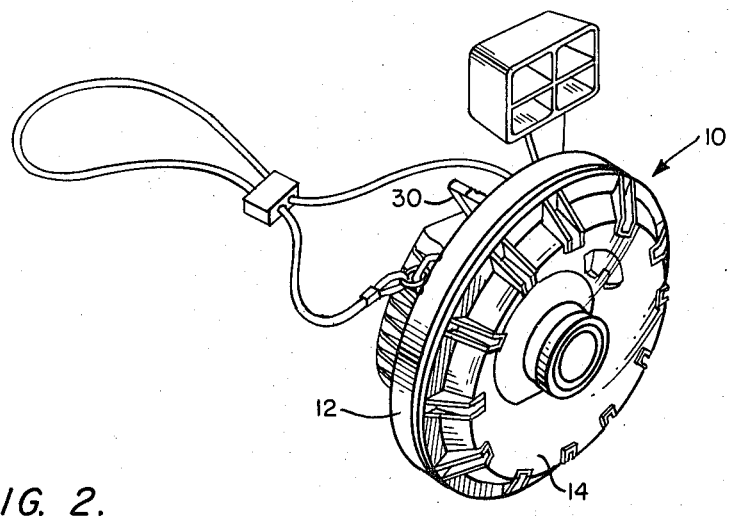
FIG. 1 is a perspective view of an underwater camera including the improved focusing mechanism of the present invention.

Referring to the drawing and particularly FIGS. 1 through 5, 10 generally designates an underwater camera including a housing 11 consisting of a rear-housing half 12 and a transparent front housing half 14 between which is mounted a camera 16.

The camera 16 includes a shutter-release button 18, a view finder 20, lens system 22 mounted in a barrel 24 having a focusing ring 26 therefor. The camera 16 is of the automatic type whereby the exposure for the film, not shown, is automatically controlled by light conditions.

The camera 16 is also of the automatic film transport type whereby when a spring, associated with winding knob 28, is wound actuation of the shutter release 18 automatically transports a new frame to a station behind the lens 22.

The housing 11 is provided with a single actuating lever 30 externally of the housing with a shaft 32 projecting into the housing which shaft has mounted thereon a shutter release lever 34 and return spring 36. The shaft 32, which passes through an opening in the rear housing 12, is provided with conventional o-ring type sealing means to prevent water from entering the housing while still permitting the shaft 32 to be rotated when the lever 30 is depressed.

Figure 4:
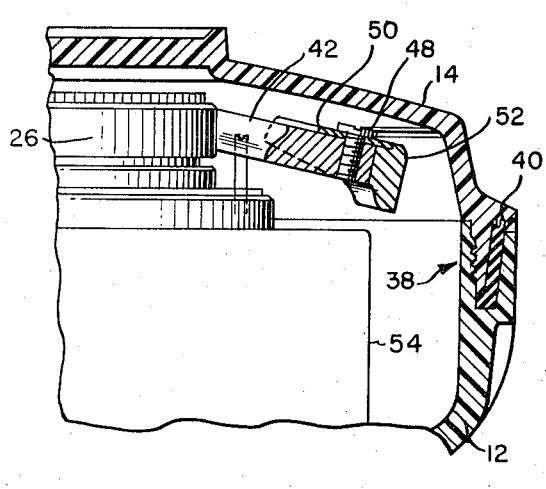
FIG. 4 is a section substantially on lines 4—4 of FIG. 2.

As clearly shown in FIG. 4 of the drawings, the front transparent portion 14 of the housing 11 and the rear portion of the housing 12 are connected by mating threads generally designated 38 on each of the housing halves together with a suitable resilient sealing gasket means 40 which prevents water from entering the housing when the front face portion is tightly screwed to the rear housing half 12.

The structures hereinabove described are of known design and have the drawback in that while the camera may be very automatic the diver before submerging must preset the distance of focus of the camera and once submerged the setting cannot be altered without coming to the surface, drying the housing, opening the casing and physically resetting the focus of the lens 22. This is a substantial drawback as often it is desired to take, for example, close-ups, pictures at intermediate distance and relatively longer distance without resurfacing.

In order to overcome these drawbacks a lever arm 42 is mounted to or integrally formed with the focusing ring 26 of the camera. At the extended end of the lever arm 42 is an enlarged portion 44 which is bored and tapped, as at 46, to receive a locking screw 48. The locking screw and its associated washer 50 secure a weight or mass 52 to the extended end of the lever arm 42 as shown in FIGS. 1-3.

The mass 52 is removably mounted to the end 44 of the lever arm 42 so that during transportation of the camera the weight of the mass can be removed to thereby prevent possible damage to the camera in the event the camera is inadvertently roughly handled.

Figure 2:
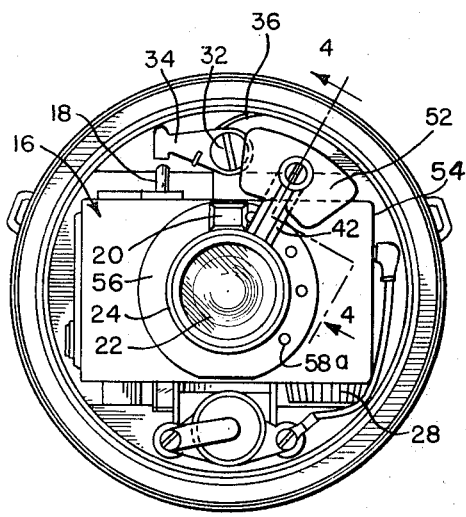
FIG. 2 is a front view of the structure shown in FIG. 1 with the face of the housing removed to more clearly show the camera and its focusing mechanism.
Figure 3:
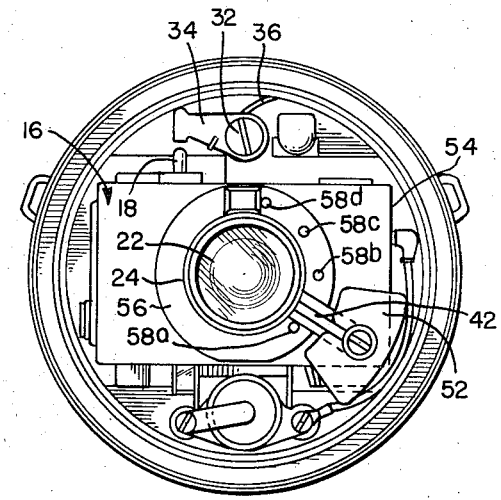
FIG. 3 is a view similar to FIG. 2 with the focusing mechanism rotated approximately 90°.

The mass or weight 52 is selected such that when the mass is mounted to the lever arm 42 its weight is sufficient to cause the lens barrel or focusing ring 26 and its associated lens or lens system to rotate into the position shown for example in FIG. 3, or to move into the position shown in FIG. 2 when the camera is held such that the view finder 20 is in the downward position or to rotate to a position intermediate said two positions when the camera is held with side 54 in a downward direction.

Figure 5:
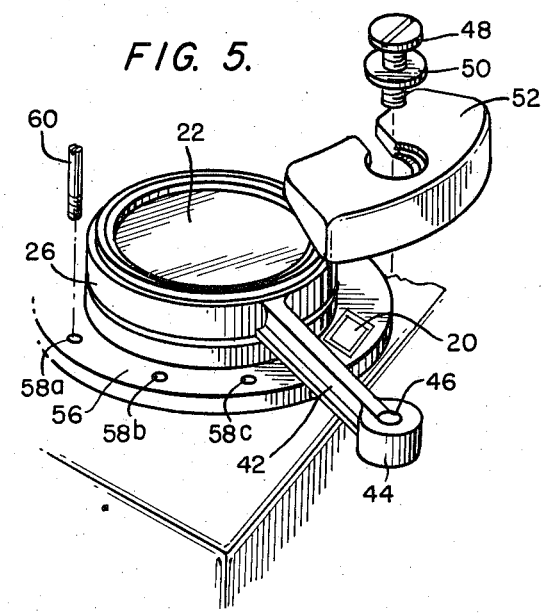
FIG. 5 is an exploded perspective view of a portion of the structure shown in FIG. 4.

In the illustrated form of the invention with the mass 52 in the FIG. 3 position the camera is focused for close-up shots and when the mass 52 is positioned in the FIG. 2 position the camera is set for critical focus at for example 12 feet to provide a focal range of for example 7 to about 20 feet.

Where desired the fixed lens mounting ring 56 may be provided with a plurality of tapped bores 58*a* through 58*d* which receive threaded stop pins such as pins 60 illustrated in FIG. 5 of the drawing whereby pins or a pin may be positioned in one or more of the tapped bores to control the range of travel of the lever arm 42 to enlarge or restrict the maximum and minimum focusing positions of the camera. With the use of the stop pins 60, which are engageable by the lever arm 42 as shown for example in FIGS. 3 and 4, a pair of settings may be selected so that for example the camera is in critical focus at 4 feet in one position of the mass 52 and at 10 feet or any other selected range when the mass is in another position.

Figure 6:
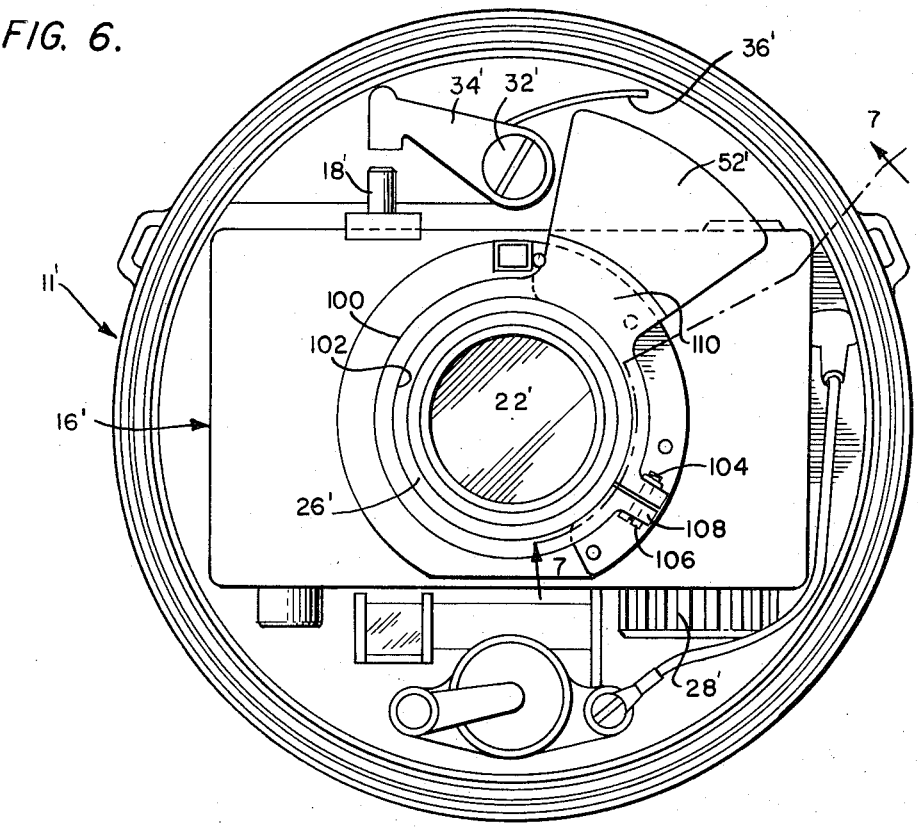
FIG. 6 is a view similar to that shown in FIG. 2 of a modified form of the present invention.
Figure 7:
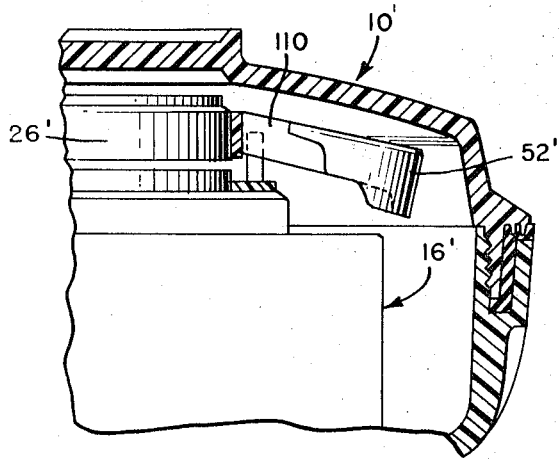
FIG. 7 is a view substantially on line 7—7 of FIG. 6.
Figure 8:
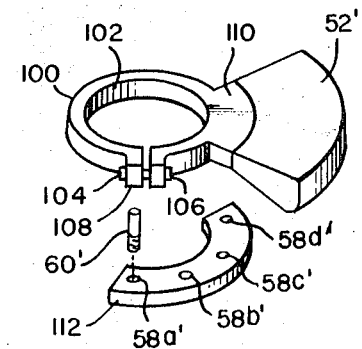
FIG. 8 is a disassembled view of the focusing mechanism shown in FIGS. 6 and 7.

Referring particularly to FIGS. 6, 7 and 8 a focusing attachment is shown which is removable when the focusing attachment is not desired. In FIGS. 6 and 7, similar parts are designated with prime reference characters and the camera 16′ is identical to that shown in FIGS. 1–5 and the housing generally designated 11′ is also of identical form to that shown in the previous form of the invention. In this form of the invention split ring 100 has an internal opening 102 of a size to be received over the focusing ring or lens barrel 26′ of the camera. A bolt 104 and associated nut 106 are provided for a pair of ears 108 of the split ring 100 whereby once the attachment is properly positioned on the lens ring 26′ it may be secured thereto by the bolt and nut arrangement.

A lever arm 110 extends from one side of the split ring 100 and carries a mass 52′ of a size such that it will cause the focusing ring or lens barrel 26′ to rotate when the camera is held in a generally upright position.

The assembly may also include a stop ring 112 provided with a plurality of tapped bores 58*a*′, 58*b*′, 58*c*′ and 58*d*′ which correspond to the elements 58*a* through 58*d* of the prior form of the invention and receive a threaded stop pin or pins 65′. The stop ring 112 may be permanently mounted on the camera by attaching the ring with a suitable cement or glue such as an epoxy resin. With the ring the photographer again has substantial control over plural ranges of focus settings without surfacing and opening the sealed housing.

From the foregoing detailed description of the present invention, it will be seen by those skilled in the art that the recited aims and objects and others are fully accomplished.

I claim:

1. Focus adjusting means for a camera mounted in a sealed housing wherein the camera is of the type such that focusing is accomplished by rotation of a lens element or elements, consisting of: an arm secured to a lens element rotating member, and a mass mounted on the extended end of said arm which mass has a weight effective to rotate the arm in a downward direction.

2. The invention defined in claim 1 wherein the arm is releasably secured to the rotating member.

3. The invention defined in claim 1 wherein the mass is releasably secured to the extended end of said arm.

4. The invention defined in claim 1 including stop means for said arm.

5. The invention defined in claim 4 wherein said stop member includes at least one stop pin having a threaded end and a cooperating stop quadrant having a plurality of bores threaded to receive said at least one stop pin.

6. The invention defined in claim 2 wherein the arm is secured to a split ring sized to be received about said lens element rotating member and means for releasably clamping said split ring to said rotating member.

* * * * *